(12) United States Patent
Nakano et al.

(10) Patent No.: US 12,697,928 B2
(45) Date of Patent: Aug. 4, 2026

(54) VEHICLE WIRE HARNESS PROTECTION DEVICE

(71) Applicant: Hitachi Astemo, Ltd., Hitachinaka (JP)

(72) Inventors: Hiroshi Nakano, Tokyo (JP); Nobuyasu Kanekawa, Tokyo (JP); Takao Fukuda, Hitachinaka (JP); Kentaro Jumonji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 189 days.

(21) Appl. No.: 18/700,364

(22) PCT Filed: Jul. 27, 2022

(86) PCT No.: PCT/JP2022/028994
§ 371 (c)(1),
(2) Date: Apr. 11, 2024

(87) PCT Pub. No.: WO2023/074070
PCT Pub. Date: May 4, 2023

(65) Prior Publication Data
US 2024/0399981 A1 Dec. 5, 2024

(30) Foreign Application Priority Data
Oct. 29, 2021 (JP) ................................. 2021-178191

(51) Int. Cl.
*B60R 16/02* (2006.01)
*B60R 16/03* (2006.01)
(Continued)

(52) U.S. Cl.
CPC .......... *B60R 16/0207* (2013.01); *B60R 16/03* (2013.01); *H02H 5/04* (2013.01); *H02H 6/00* (2013.01)

(58) Field of Classification Search
CPC ...... B60R 16/0207; B60R 16/03; H02H 5/04; H02H 6/00
See application file for complete search history.

(56) References Cited

U.S. PATENT DOCUMENTS 8,405,946 B2    3/2013  Higuchi et al.
8,767,367 B2    7/2014  Higuchi et al.
(Continued)

FOREIGN PATENT DOCUMENTS

DE     20 2005 011 235 U1    1/2007
EP           3 614 515 A1    2/2020
(Continued)

OTHER PUBLICATIONS

International Search Report and Written Opinion with English translations for PCT/JP2022/028994, dated Oct. 4, 2022, 10 pages.
(Continued)

*Primary Examiner* — John A Tweel, Jr.
(74) *Attorney, Agent, or Firm* — Foley & Lardner LLP

(57) ABSTRACT

Included are: a current detection element which detects a current flowing through a wire harness which supplies power to in-vehicle equipment mounted on a vehicle; a standard temperature generation unit which obtains a standard temperature by using a predetermined value or a detection value of a predetermined temperature sensor among a plurality of temperature sensors mounted on the vehicle; a temperature estimation unit which estimates a temperature of the wire harness by using a current detection value and a standard temperature value; a shutoff determination unit which makes a shutoff determination on the basis of the estimated temperature; and a shutoff element which shuts off the current flowing through the wire harness on the
(Continued)

basis of the determination made by the shutoff determination unit. This enables vehicle control without a dedicated temperature sensor.

19 Claims, 10 Drawing Sheets

(51) Int. Cl.
  *H02H 5/04*          (2006.01)
  *H02H 6/00*          (2006.01)

(56)          References Cited

U.S. PATENT DOCUMENTS

| | | | |
|---|---|---|---|
| 9,042,069 B2 | 5/2015 | Higuchi et al. | |
| 10,811,870 B2 * | 10/2020 | Kikuchi | G01K 3/005 |
| 10,971,920 B2 | 4/2021 | Fuseya et al. | |
| 12,444,923 B2 * | 10/2025 | Nakano | B60R 16/023 |
| 2010/0254059 A1 | 10/2010 | Higuchi et al. | |
| 2012/0176115 A1 | 7/2012 | Higuchi et al. | |
| 2013/0163138 A1 | 6/2013 | Higuchi et al. | |
| 2017/0197566 A1 | 7/2017 | Nakamura et al. | |
| 2019/0165564 A1 | 5/2019 | Fuseya et al. | |
| 2020/0298775 A1 | 9/2020 | Schraud | |

FOREIGN PATENT DOCUMENTS

| | | |
|---|---|---|
| JP | 2009-130944 A | 6/2009 |
| JP | 2011-072136 A | 4/2011 |
| JP | 2017-007554 A | 1/2017 |
| JP | 2017-172939 A | 9/2017 |
| JP | 2019-029141 A | 2/2019 |
| JP | 2019-097357 A | 6/2019 |
| JP | 2019-142316 A | 8/2019 |

OTHER PUBLICATIONS

Extended European Search Report issued in corresponding EP Application No. 22886406.2, mailed Oct. 15, 2025 (8 pages).

* cited by examiner

ENVIRONMENTAL TEMPERATURE

ENVIRONMENTAL TEMPERATURE

VEHICLE WIRE HARNESS PROTECTION DEVICE

TECHNICAL FIELD

The present invention relates to a fuel injection valve control device and a fuel injection valve control method.

BACKGROUND ART

In an electrical and electronic device, a fuse which melts due to overcurrent is used in order to prevent overheating and smoking due to overcurrent. Such a fuse to be cut off by melting needs to be replaced after melting and is configured to be connected by using a thick wire harness in consideration of variation in melting characteristics, which is a cause of an increase in cost such as man-hours for replacement and wire harness weight. In this regard, in recent years, a method for realizing a conventional fuse function by using a semiconductor switch using a power semiconductor and a temperature estimation technique has been used.

In the method using this temperature estimation technique, a current value flowing through the wire harness is detected, a heating temperature of the wire harness is estimated by calculation using the current value, and the semiconductor switch is shut off to provide protection before the wire harness reaches the point of smoking or ignition. When the overcurrent is resolved by performing overheat protection using such a semiconductor switch, the power supply can be restored by turning on the semiconductor switch again, thereby eliminating the need for component replacement which is required in a case where the fuse is used. In addition, since it is not necessary to consider the melting variation in the characteristics of the conventional fuse, a wire harness thinner than the conventional wire harness can be used, so that the weight and cost can be reduced.

PTL 1 describes an overheat protection technique using such temperature estimation of a semiconductor switch and a wire harness. In the technique described in PTL 1, an energizing current to a load is detected every predetermined time in order to protect an electric wire used to supply power from a power source to the load. Then, the rising temperature of the electric wire is calculated by using a relational expression regarding the detected energizing current and the heat dissipation/heat generation of the electric wire, and the calculated rising temperature is added to the standard temperature to estimate the temperature of the electric wire. In a case where the estimated temperature of the electric wire becomes equal to or higher than a predetermined upper limit temperature, the supply of power from the power supply to the load is stopped, and the electric wire is protected.

CITATION LIST

Patent Literature

PTL 1: JP 2009-130944 A

SUMMARY OF INVENTION

Technical Problem

Incidentally, in the front area of the vehicle, a high-temperature and large-capacity heat source such as an engine or a motor for driving the vehicle is mounted in addition to the electrical and electronic device. In such an area, an air circulation state changes due to a difference in speed between a state where the vehicle is traveling and a state where the vehicle is stopped. In addition, a temperature distribution the front area changes complicatedly according to the load state of the engine or the motor. Therefore, the environmental temperature of the wire harness laid in the front area changes due to the traveling state and the influence of the heat source such as the engine or the motor.

When the temperature of the wire harness is estimated, the estimation is performed by calculating an amount of temperature rise caused by self-heating of the wire harness by the current, and adding the amount of temperature rise to a standard temperature which is an environmental temperature at which the wire harness is laid. Here, when an error occurs in the acquired value of the standard temperature, the estimated temperature may be incorrect, and there is a possibility that the semiconductor switch cannot be shut off at an appropriate temperature.

For example, in a case where the estimated temperature is higher than an actual temperature, the amount of current that can be supplied may decrease, causing a sudden shutoff of the semiconductor switch, thereby decreasing the amount of current that can be used.

Conversely, in a case where the estimated temperature is lower than the actual temperature, there is a risk that the semiconductor switch is not shut off at an appropriate shutoff threshold to result in the smoking or ignition of the wire harness.

As a method of acquiring the standard temperature, a method of installing a temperature sensor in the vicinity of the wire harness to be estimated is considered. However, in the case of installing a temperature sensor, it is necessary to install temperature sensors in a large number of wire harnesses in the vehicle, which causes a problem of an increase in component cost and man-hours for installation.

As a method of acquiring the standard temperature without installing a temperature sensor in the vicinity of the wire harness, a method of actually measuring or simulating a temperature distribution in an engine room in advance from an operation state such as the speed of the vehicle and an engine load can be considered. However, in this method, the temperature distribution in the engine room changes depending on a vehicle type, the size of the engine, and a component layout, and thus there is a problem that the number of man-hours for adapting the method to each vehicle becomes enormous.

As described above, it has been desired to develop a vehicle control device capable of acquiring a standard temperature suitable for various vehicles with a simple configuration without providing a dedicated temperature sensor for acquiring a temperature of a wire harness.

Solution to Problem

In order to solve the above problems, for example, the configuration described in the claims is adopted.

The present application includes a plurality of means for solving the above problems. Examples of the means include a vehicle control device including: a current detection element which detects a current flowing through a wire harness which supplies power to in-vehicle equipment mounted on a vehicle; a standard temperature generation unit which obtains a standard temperature by using a predetermined value or a detection value of a predetermined temperature sensor among a plurality of temperature sensors mounted on the vehicle according to a traveling state of the vehicle or an environment; a temperature estimation unit which calculate an estimated temperature of the wire harness by using a current detection value from the current detection element and a standard temperature value obtained by the standard temperature generation unit; a shutoff determination unit which makes a shutoff determination on the basis of the estimated temperature estimated by the temperature estimation unit; and a shutoff element which shuts off the current flowing through the wire harness on the basis of the determination made by the shutoff determination unit.

Advantageous Effects of Invention

According to the present invention, the standard temperature to be used for temperature estimation of the wire harness can be set to an optimum temperature according to the traveling state and the traveling environment, and the overheating of the wire harness can be reliably detected and blocked without excessively limiting the amount of current that can be supplied.

In addition, a more accurate environmental temperature can be acquired as compared with a case where only a temperature sensor which detects the temperature of the area where the wire harness is installed is used, and thus it is possible to design the wire harness to be thinner with a reduced design margin.

Problems, configurations, and effects other than those described above will be clarified by the following description of embodiments.

DESCRIPTION OF EMBODIMENTS

First Embodiment

Hereinafter, a vehicle control device of a first embodiment of the present invention will be described with reference to FIGS. 1 to 8. The vehicle control device of the present embodiment is a control device of a device (in-vehicle device) installed in a vehicle which is a moving body such as an automobile and mounted on the vehicle. The vehicle control device has a function as a heating protection system for a wire harness which is a cable connected to the in-vehicle device.

[Basic Configuration of Heating Protection System]

Figure 1:
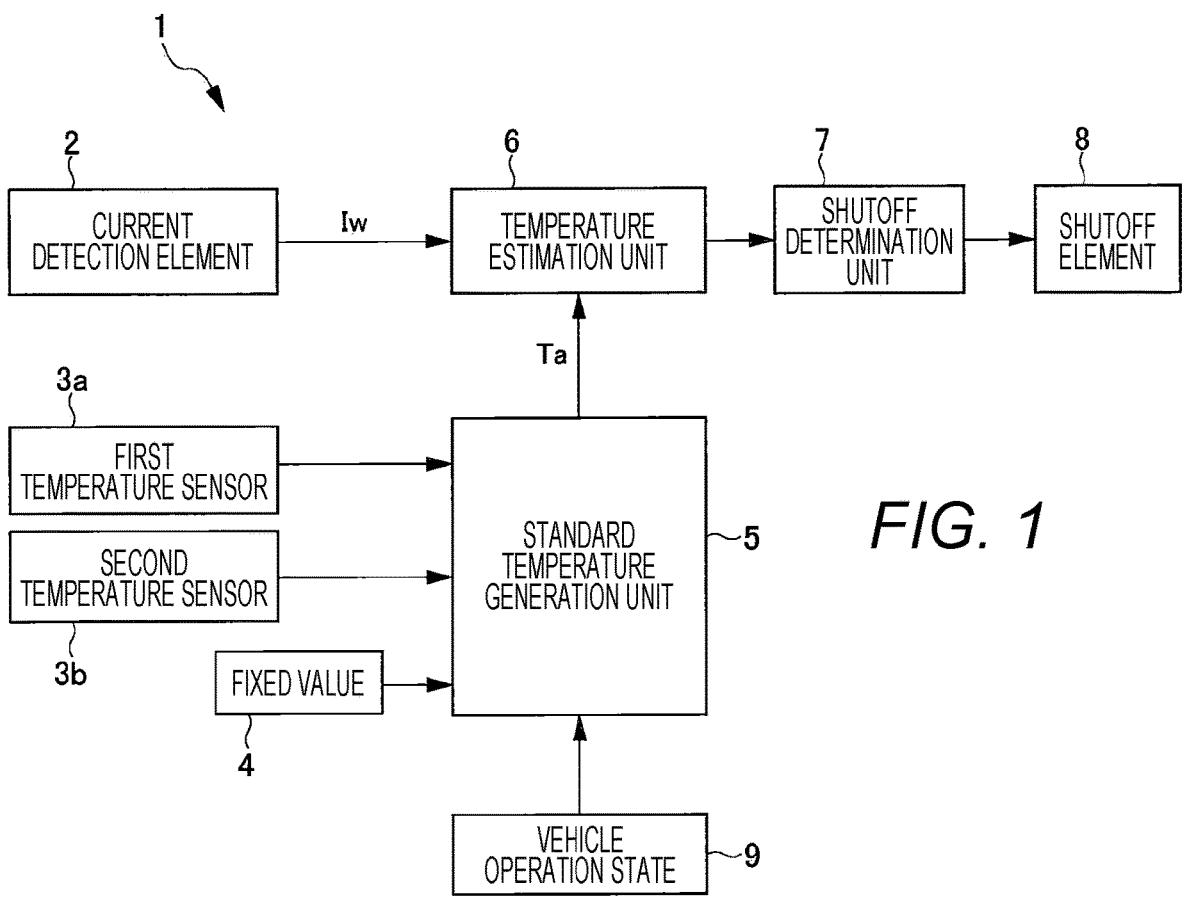
FIG. 1 is a configuration diagram of a vehicle control device according to a first embodiment of the present invention.

FIG. 1 is a diagram illustrating a basic configuration of a heating protection system 1 for a wire harness in a vehicle control device to which the first embodiment is applied.

In the heating protection system 1, a current flowing through a wire harness (not illustrated) is detected as a current value Iw by a current detection element 2. A first temperature sensor 3$a$ and the second temperature sensor 3$b$ are temperature sensors mounted on the vehicle, and are temperature sensors for equipment mounted in the vicinity of an area where the wire harness is laid. That is, the first temperature sensor 3$a$ and the second temperature sensor 3$b$ are not installed for detecting the temperature of the wire harness, but are installed for monitoring the state of in-vehicle equipment, the state of air conditioning equipment, and the like. Specific examples of the first temperature sensor 3$a$ and the second temperature sensor 3$b$ will be described later.

A fixed value 4 is a temperature set value which is a predetermined temperature used when the first temperature sensor 3$a$ and the second temperature sensor 3$b$ are not used. For example, the fixed value 4 is a design maximum value of the environmental temperature of the area where the wire harness is laid. Note that the fixed value 4 is not determined to be one value, but is a design parameter set to an arbitrary value for each area where the wire harness is laid.

A standard temperature generation unit 5 generates a standard temperature Ta, which is the ambient temperature of the wire harness, by using the first temperature sensor 3$a$, the second temperature sensor 3$b$, and the fixed value. The standard temperature generation unit 5 acquires, as vehicle operation state information 9, a vehicle operation state such as whether the vehicle is traveling or stopped or environment information such as a vehicle ambient temperature from other control equipment, and generates the standard temperature Ta on the basis of the acquired vehicle operation state information 9.

A temperature estimation unit 6 estimates and calculates the heating temperature of the wire harness by using the current value from the current detection element 2 and the standard temperature Ta from the standard temperature generation unit 5. This estimation calculation is performed by using a model based on the calorific value and the heat dissipation characteristics of the wire harness to be esti-
mated. An example of a specific estimation method will be
described later.

A shutoff determination unit 7 outputs a shutoff instruc-
tion in a case where the estimated temperature of the wire
harness estimated by the temperature estimation unit 6
exceeds a predetermined threshold. A shutoff element 8
shuts off the current flowing through the wire harness on the
basis of the shutoff instruction from the shutoff determina-
tion unit 7. As the shutoff element 8, a semiconductor switch
composed of a power semiconductor is used.

[Method of Estimating Temperature of Wire Harness]

Next, an example of a method of estimating the tempera-
ture of the wire harness in the temperature estimation unit 6
will be described.

Figure 2:
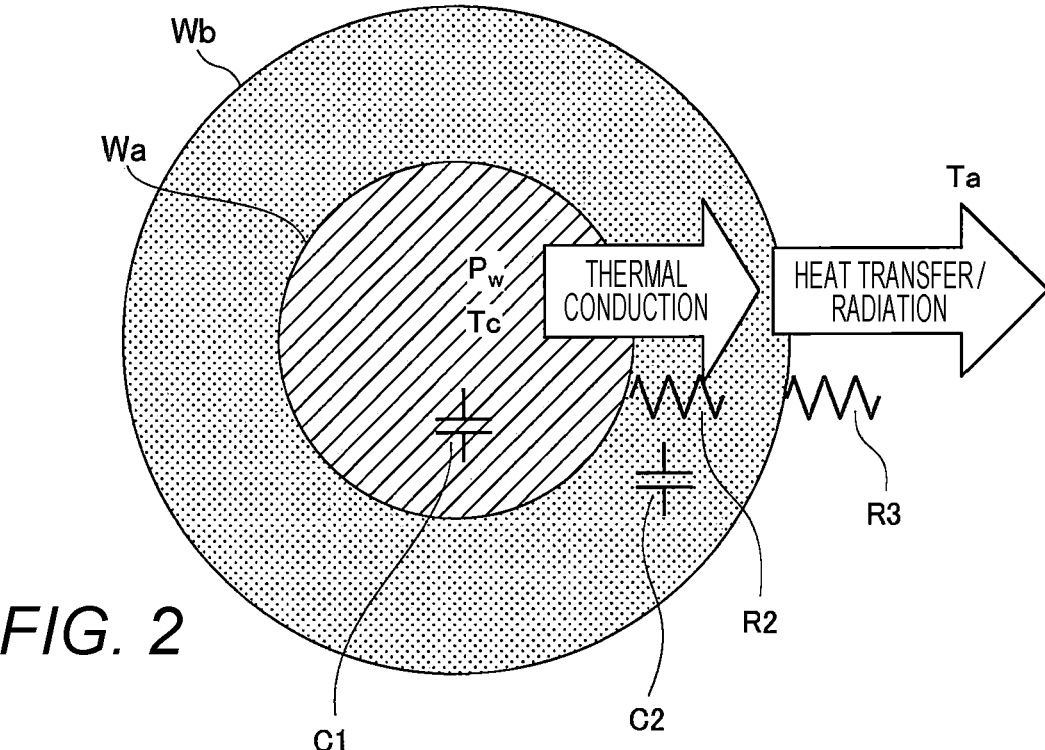
FIG. 2 is a cross-sectional view illustrating a heat dissipation path of a wire harness, for explaining temperature estimation processing in the first embodiment of the present invention.

FIG. 2 is a cross-sectional view illustrating a heat dissi-
pation path of the wire harness in the temperature estimation
unit 6.

The wire harness is composed of a conductor portion Wa
through which a current flows and an insulator Wb covering
the conductor portion Wa. When a current flows through the
conductor portion Wa, Joule heat is generated by the resis-
tance of the conductor Wa, resulting in heat generation Pw.
The heat generation Pw is accumulated in a heat capacity C1
of the conductor Wa, and is thermally conducted to the
insulator Wb at the same time.

In the insulator Wb, the heat is accumulated in the heat
capacity C2 of the insulator Wb, and is thermally conducted
to the surface of the insulator Wb via a thermal resistance R2
of the insulator Wb. Then, the heat is dissipated to the
surrounding air on the surface of the insulator Wb. The heat
dissipation to surrounding air is determined by a thermal
resistance R3 determined by a heat transfer coefficient and
radiant heat.

Figure 3:
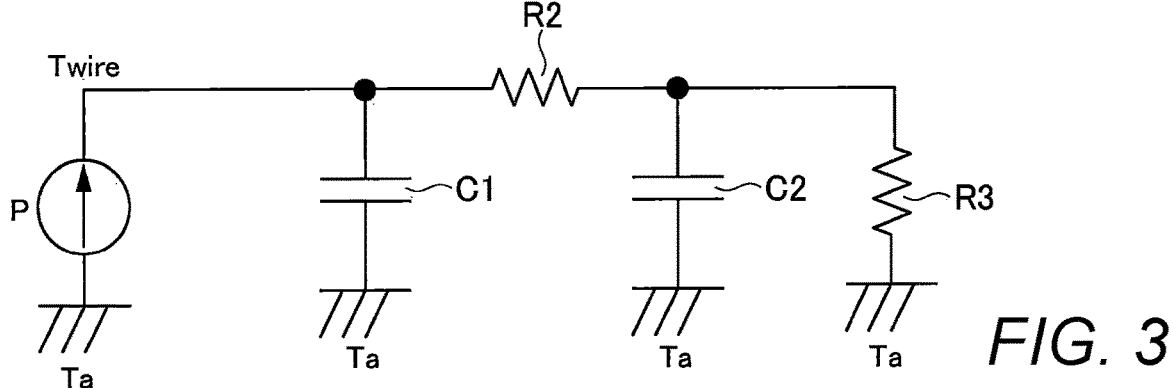
FIG. 3 is a circuit diagram illustrating a heat dissipation model represented by an equivalent thermal network, for explaining the temperature estimation processing in the first embodiment of the present invention.

FIG. 3 is a circuit diagram illustrating this heat dissipation
model by an equivalent thermal network.

As illustrated in FIG. 3, heat P corresponding to the heat
generation Pw illustrated in FIG. 2 is transmitted through a
wire harness Twire. In the equivalent circuit of FIG. 3, the
thermal resistance R2 of an edge body Wb and the thermal
resistance R3 at the time of heat dissipation to the surround-
ing air are connected in series to the heat P. In addition, the
heat capacity C1 of the conductor Wa and the heat capacity
C2 of the insulator Wb are connected to the wire harness
Twire. Note that in FIG. 3, Ta is a standard temperature.

Figure 4:
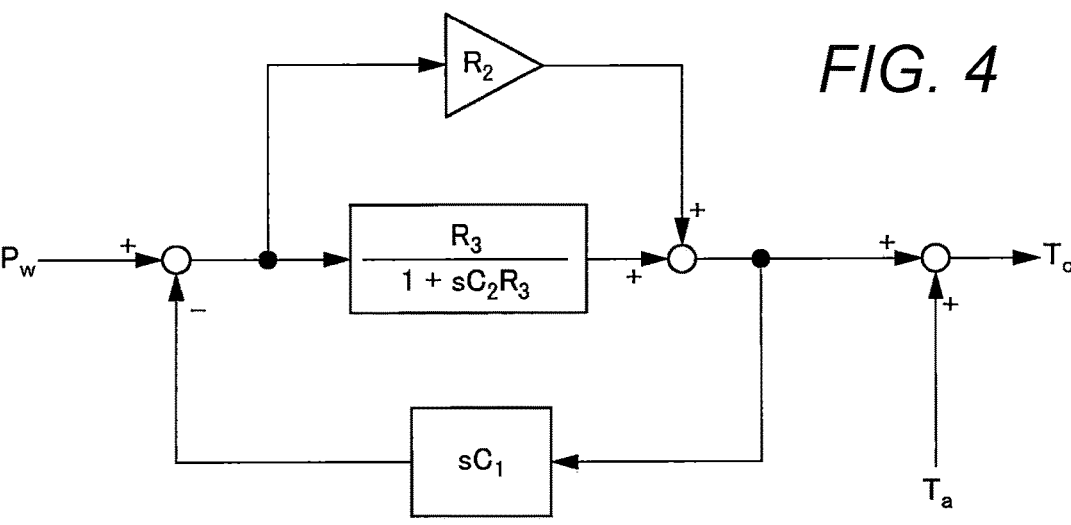
FIG. 4 is a block diagram illustrating the circuit of FIG. 3 converted into a transfer function where an input is a calorific value Pw and an output is a conductor temperature Tc.

FIG. 4 is a block diagram obtained by converting the
equivalent circuit of FIG. 3 into a transfer function where an
input is a calorific value Pw and an output is a conductor
temperature Tc.

As illustrated in FIG. 4, with the heat generation Pw as an
input, calculation is performed in which the standard tem-
perature Ta is further added to a value obtained by an
arithmetic expression using the transfer function using the
heat capacity C1, the heat capacity C2, and the thermal
resistances R2 and R3, thereby obtaining the conductor
temperature Tc.

The temperature estimation of the wire harness is esti-
mated and calculated on the basis of the transfer function
illustrated in FIG. 4.

[Configuration of Standard Temperature Generation Unit]

Figure 5:
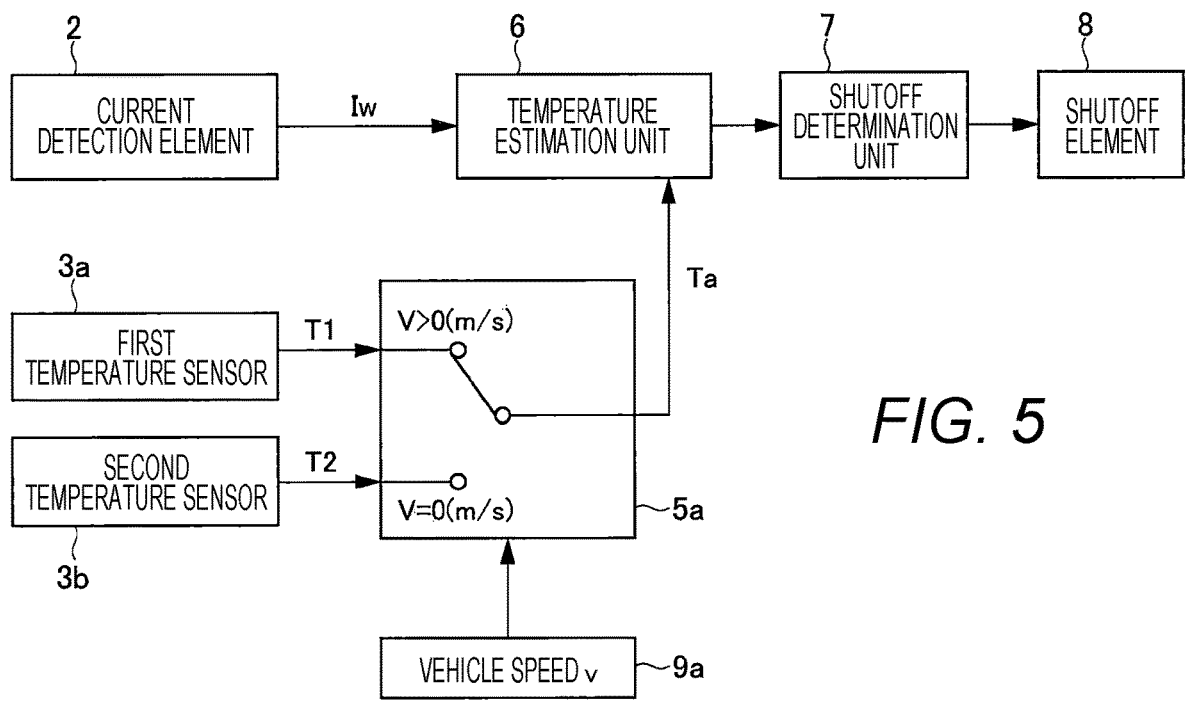
FIG. 5 is a configuration diagram illustrating a specific configuration example (Example 1) of a standard temperature generation unit of the vehicle control device according to the first embodiment of the present invention.

FIG. 5 illustrates a configuration using a standard tem-
perature generation unit 5a which is one specific example
(Example 1) of the standard temperature generation unit 5.
In FIG. 5, the configuration other than the standard tem-
perature generation unit 5a is the same as the configuration
already described in FIG. 1.

A temperature T1 and a temperature T2 from the first
temperature sensor 3a and the second temperature sensor 3b
are input to the standard temperature generation unit 5a. In
addition, information 9a regarding a vehicle speed v is input
to the standard temperature generation unit 5a.

In a case where the vehicle is traveling (v>0 m/s), the
standard temperature generation unit 5a outputs the value of
the first temperature sensor 3a as the standard temperature
value Ta. On the other hand, in a case where the vehicle
speed is stopped (v=0 m/s), the standard temperature gen-
eration unit 5a outputs the value of the second temperature
sensor 3b as the standard temperature Ta. As described
above, the standard temperature generation unit 5a acquires
the standard temperature Ta by switching the temperature T1
and the temperature T2 according to the vehicle speed v as
the traveling state of the vehicle.

Note that, here, a configuration in which switching is
performed when the vehicle speed reaches 0 m/s has been
described. However, standard temperature generation pro-
cessing is not limited to this, and for example, a configu-
ration can also be made in which switching is performed
when the vehicle speed becomes low even during traveling.
In addition, switching can also be performed after a lapse of
a certain period of time after stopping, and a switching
condition can be arbitrarily set. In addition, in the example
illustrated in FIG. 5, two temperature sensors are used, but
the present invention is not limited thereto, and the standard
temperature generation unit 5a may be configured to use a
plurality (two or more) of temperature sensors to switch
temperatures from the plurality (two or more) of temperature
sensors.

Figure 6:
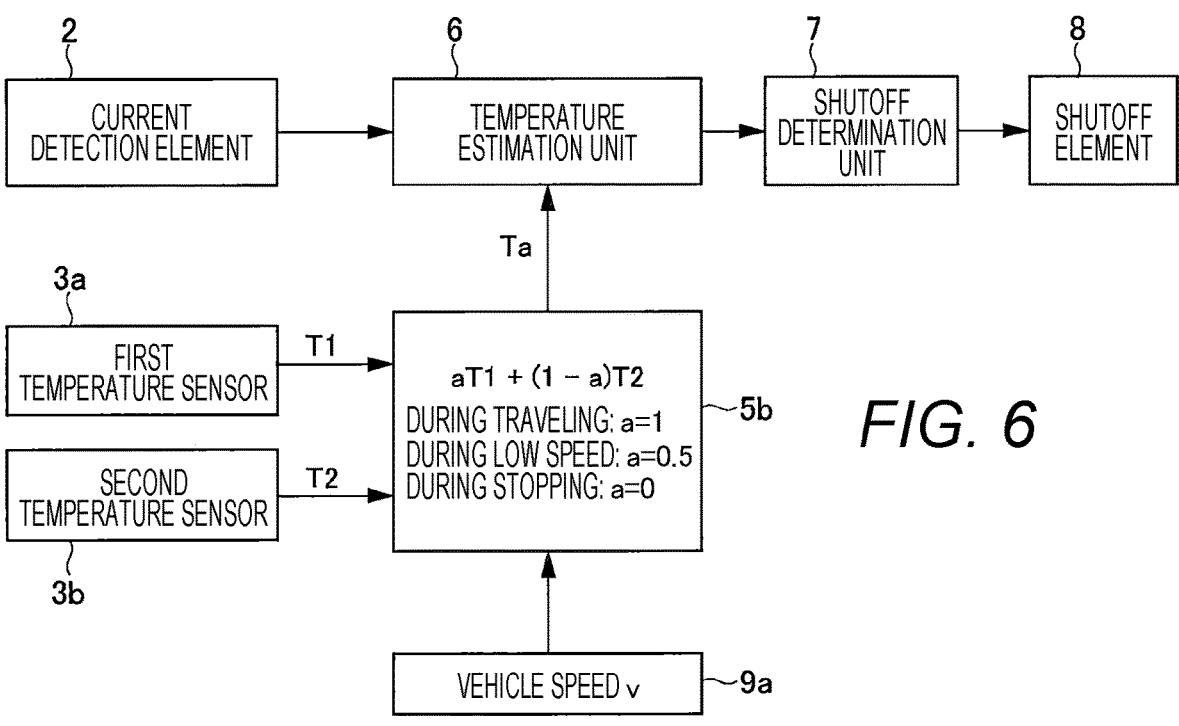
FIG. 6 is a configuration diagram illustrating a specific configuration example (Example 2) of the standard temperature generation unit of the vehicle control device according to the first embodiment of the present invention.

FIG. 6 illustrates a configuration using a standard tem-
perature generation unit 5b which is another specific
example (Example 2) of the standard temperature generation
unit 5. Also in FIG. 6, the configuration other than the
standard temperature generation unit 5b is the same as the
configuration already described in FIG. 1.

The temperature T1 and the temperature T2 from the first
temperature sensor 3a and the second temperature sensor 3b
are input to the standard temperature generation unit 5b. In
addition, the information 9a regarding the vehicle speed v is
input to the standard temperature generation unit 5b.

The standard temperature generation unit 5b outputs, as
the standard temperature Ta, a weighted average value
obtained by weighting the temperature T1 and the tempera-
ture T2 with a parameter a according to the vehicle speed v.
The weighting parameter a is appropriately set according to
the vehicle speed v. For example, in a case where the vehicle
is traveling at a high speed (v>>0 m/s), a=1 is set, and the
temperature T1 of the temperature sensor 3a is output as the
standard temperature value Ta. When the vehicle speed
becomes low (v>0 m/s), a=0.5 is set, and an intermediate
value between the temperature T1 and the temperature T2 is
output as the standard temperature Ta. In a case where the
vehicle is stopped (v=0 m/s), a=0 is set, and the value T2 of
the temperature sensor 3b is output as the standard tempera-
ture Ta. As described above, the standard temperature Ta is
set according to the vehicle speed as the traveling state of the
vehicle. Accordingly, the change of the standard temperature
from the sensor-detected temperature to the fixed value
becomes smooth, and more excellent temperature estimation
can be performed.

Note that, in the example illustrated in FIG. 6, a relation-
ship between the weighting parameter a and the speed v is
not limited to the above-described conditions, and is a
parameter that can be arbitrarily designed. In addition, in the
example of FIG. 6, the two temperature sensors are used, but the present invention is not limited thereto, and the standard temperature generation unit 5b may be configured to use a plurality (two or more) of temperature sensors.

[Specific Configuration Example when Applied to Vehicle]

Figure 7:
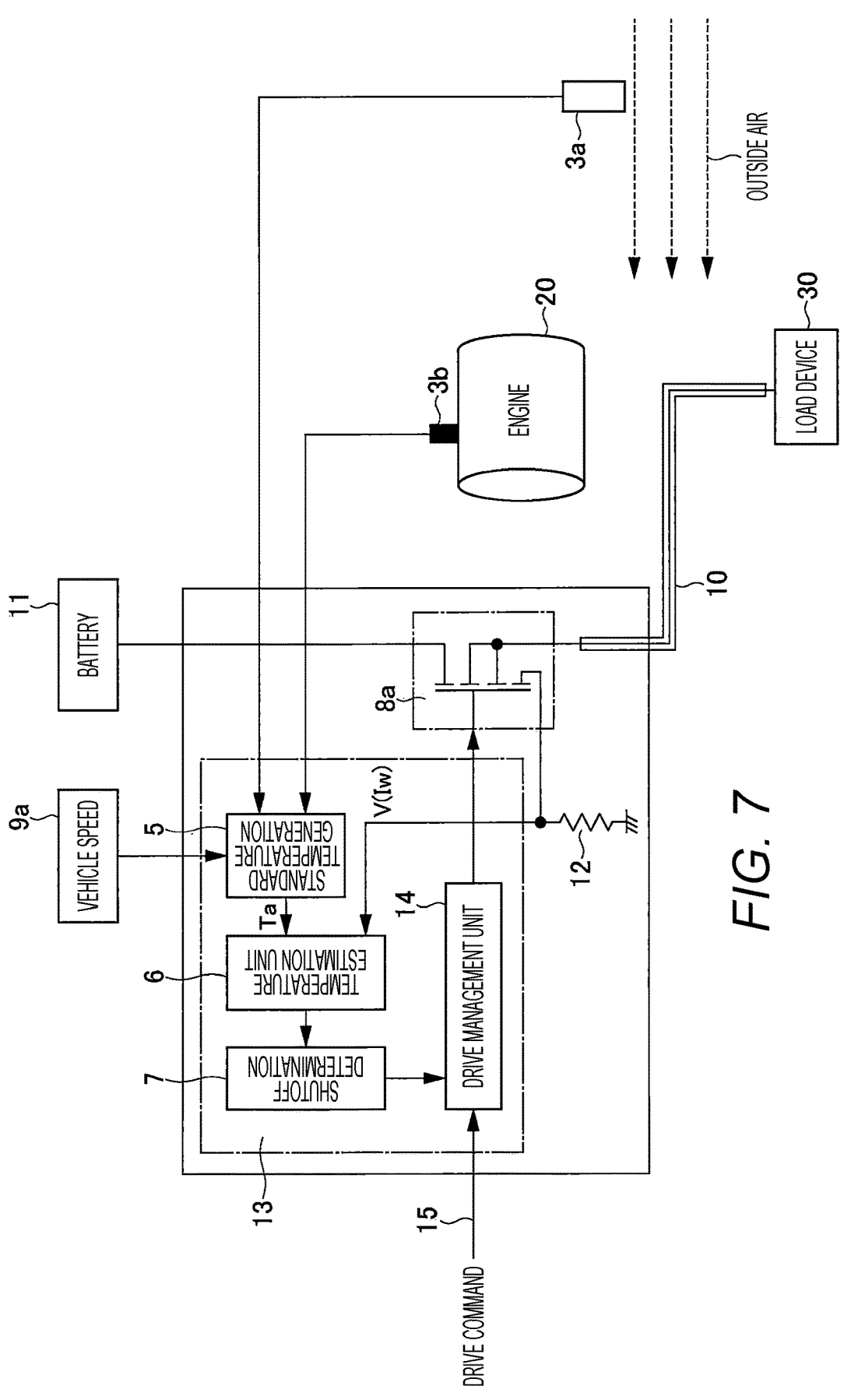
FIG. 7 is a configuration diagram in which the vehicle control device according to the first embodiment of the present invention is adapted to a vehicle with an engine.

FIG. 7 illustrates a specific example in which the vehicle control device of the present embodiment is applied to a vehicle.

In the example illustrated in FIG. 7, an intake air temperature sensor of an engine which is an outside air temperature sensor for detecting the outside air temperature of the vehicle, an outside air temperature sensor of an air conditioner, or the like is used as the first temperature sensor 3a, and an engine cooling water temperature sensor for detecting the temperature of the engine 20 which is equipment mounted on the vehicle is used as the second temperature sensor 3b.

Then, in the vehicle, power is supplied to a load device by a wire harness 10 to be subjected to temperature estimation. The wire harness 10 is connected to a current sensing MOS-FET 8a as the shutoff element 8, and the current sensing MOS-FET 8a is connected to a battery 11. The current sensing MOS-FET 8a includes an input terminal of a shutoff signal for shutting off the current flowing through the wire harness 10, and a current detection element which outputs a minute current proportional to the current flowing through the wire harness 10. The output current from the current detection element flows through a resistor 12 and is converted into a voltage value. This voltage value is equivalent to a signal indicating the current flowing through the wire harness 10.

Note that the engine 20, the first temperature sensor 3a which detects an intake air temperature and an outside air temperature, the second temperature sensor 3b which is an engine cooling water temperature sensor, and the wire harness 10 illustrated in FIG. 7 are arranged in the front area of the vehicle.

A calculator 13 includes the standard temperature generation unit 5, the temperature estimation unit 6, the shutoff determination unit 7, and a drive management unit 14.

As the calculator 13, a microcomputer or the like can be used.

The temperature information from the first temperature sensor 3a and the second temperature sensor 3b, and the vehicle speed information 9a are input to the standard temperature generation unit 5. The standard temperature Ta output from the standard temperature generation unit 5 is input to the temperature estimation unit 6.

In addition, a voltage value V(Iw) of the resistor 12 indicating the current flowing through the wire harness 10 is input to the temperature estimation unit 6. The temperature estimation unit 6 estimates the temperature of the wire harness 10 by the above-described method by using the standard temperature Ta and the voltage value V(Iw).

The shutoff determination unit 7 makes a shutoff determination on the basis of a result of estimation by the temperature estimation unit 6. When a temperature estimation value is higher than a predetermined threshold, a shutoff command is output to the drive management unit 14. The drive management unit 14 receives a drive command 15 of the load device from the outside and outputs a drive signal to the current sensing MOS-FET 8a. The current sensing MOS-FET 8a is turned on by the drive signal and supplies power to the load device. In the case of receiving the shutoff command from the shutoff determination unit 7, the drive management unit 14 forcibly transmits a shutoff signal to the current sensing MOS-FET 8a to shut off the current flowing through the wire harness 10.

Similarly to the standard temperature generation unit 5a described with reference to FIG. 5, in a state where the vehicle is traveling (v>0 m/s), the standard temperature generation unit 5 outputs, as the standard temperature value Ta, the value of the first temperature sensor 3a which detects an intake air temperature or an outside air temperature. In addition, in a state where the vehicle is stopped (v=0 m/s), the standard temperature generation unit 5 outputs, as the standard temperature Ta, the value of the second temperature sensor 3b which detects the temperature of the engine. As described above, according to the vehicle speed v indicating the traveling state of the vehicle, the standard temperature generation unit 5 switches the standard temperature Ta from the temperature of the outside air to the temperature of the in-vehicle equipment, and supplies the temperature to the temperature estimation unit 6.

In a case where the vehicle is traveling, the outside air is taken into the front area where the wire harness 10 is laid, and the air circulates. Therefore, in the traveling state, an intake air temperature sensor value and an outside air temperature sensor value of the engine close to the outside air temperature are set to the standard temperature.

On the other hand, in a case where vehicle is stopped, the circulation of the air in the front area deteriorates, and the influence of the heat dissipation from the engine becomes great. Therefore, in the stopped state, a temperature value of a cooling water temperature sensor, an oil temperature sensor, or the like close to the engine temperature is set as the standard temperature.

When the standard temperature generation unit 5 sets the standard temperature as described above, the standard temperature can be acquired as a temperature close to the actual state of the ambient temperature of the wire harness in the temperature estimation of the wire harness 10, so that the temperature estimation unit 6 can improve the estimation accuracy of the temperature.

In the front area of the vehicle, equipment, which has a high temperature and a large heat capacity, such as an engine is mounted. In the temperature estimation of the wire harness, when the standard temperature Ta is set on the basis of the maximum temperature of the area where the wire harness is always laid, the estimated temperature of the wire harness becomes excessively high, and the amount of current to be supplied is excessively limited. According to the present embodiment, the temperature sensor to be the basis of the standard temperature Ta is switched according to the traveling state, and thus the estimated temperature is obtained by using the standard temperature more suitable for the actual state, so that excessive current limitation can be avoided.

Note that in the example of FIG. 7, the intake air temperature sensor of the engine and the outside air temperature sensor of the air conditioner are used as the first temperature sensor 3a. However, each temperature sensor is not limited thereto, and another temperature sensor may be used as long as a similar temperature can be acquired. In addition, the temperature sensor of the cooling water is used as the temperature of the engine, but the temperature of the engine is not limited thereto, and it is sufficient if a similar temperature such as the oil temperature of the engine can be acquired.

In addition, in the example of FIG. 7, the configuration has been described in which the first temperature sensor 3a and the second temperature sensor 3b are switched according to the vehicle speed v. However, the standard temperature generation unit 5 may be configured to output, as the standard temperature Ta, the weighted average value based on the weighting parameter a illustrated in FIG. 6.

[Example of Case of Electric Vehicle]

Figure 8:
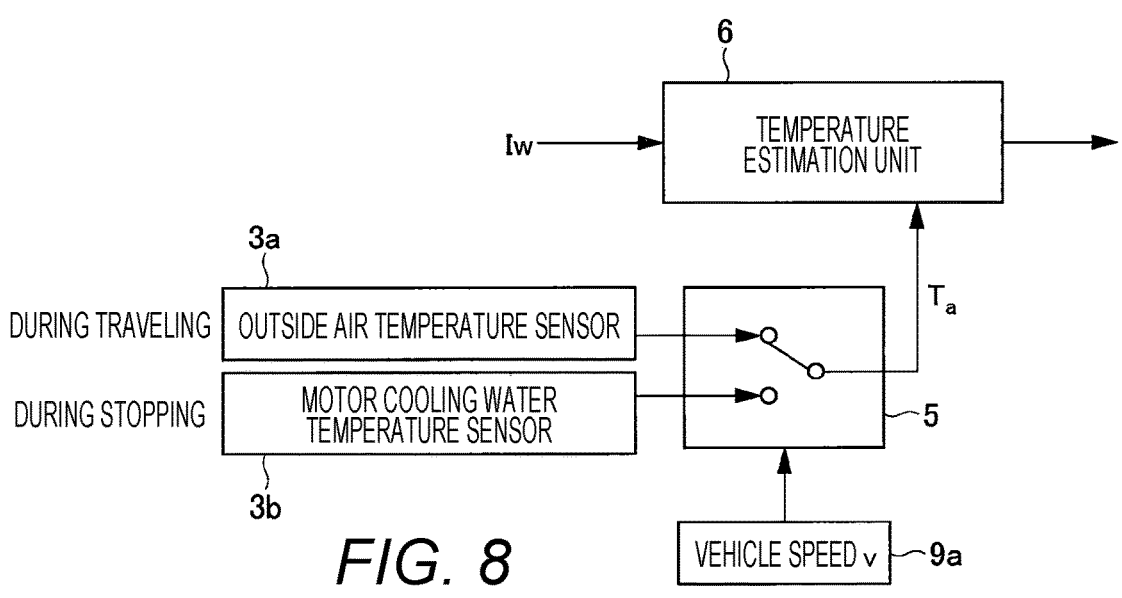
FIG. 8 is a configuration diagram in which the first embodiment of the present invention is adapted to a vehicle with a motor.

FIG. 8 illustrates a configuration example of a front area in an electric vehicle in which the driving device of the vehicle is a motor.

In the case of the electric vehicle, equipment serving as a heat source mounted in the front area is a driving motor. Therefore, a motor cooling water temperature sensor which indicates the temperature of the motor can be used as the second temperature sensor 3*b*. In this case, a temperature from the first temperature sensor 3*a* which detects the outside air temperature obtained from the air conditioner or the like, and a temperature from the temperature sensor 3*b* for a motor cooling water temperature which detects the temperature of the motor are input to the standard temperature generation unit 5. In a case where the vehicle is traveling (v>0 m/s), the standard temperature generation unit 5 outputs, as the standard temperature value Ta, the value of the first temperature sensor 3*a* which detects the outside air temperature. In a case where the vehicle speed is stopped (v=0 m/s), the value of the second temperature sensor 3*b* indicating the cooling water temperature of the motor is output as the standard temperature Ta. As described above, also in the electric vehicle, according to the vehicle speed as the traveling state of the vehicle, switching from temperature of the outside air to the temperature of the in-vehicle equipment is performed to acquire the standard temperature.

Second Embodiment

Figure 9:
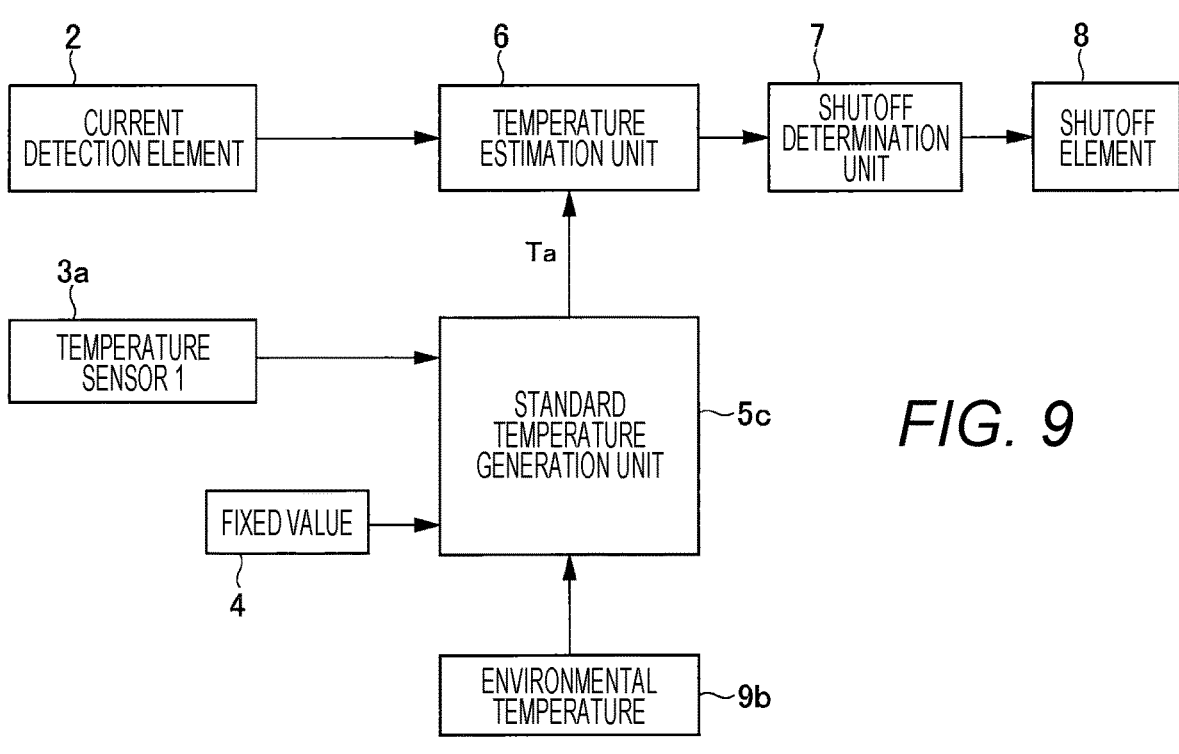
FIG. 9 is a configuration diagram of a vehicle control device according to a second embodiment of the present invention.
Figure 10:
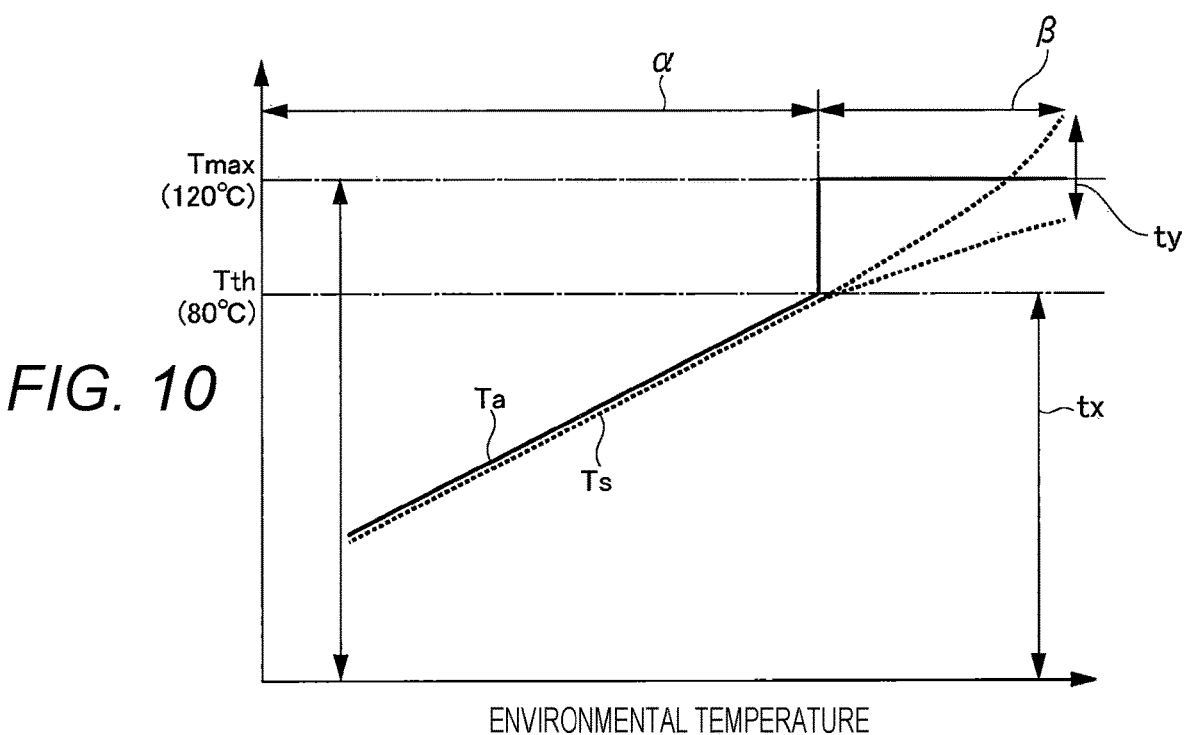
FIG. 10 is a characteristic diagram illustrating an operation example (Example 1) of the vehicle control device according to the second embodiment of the present invention.
Figure 11:
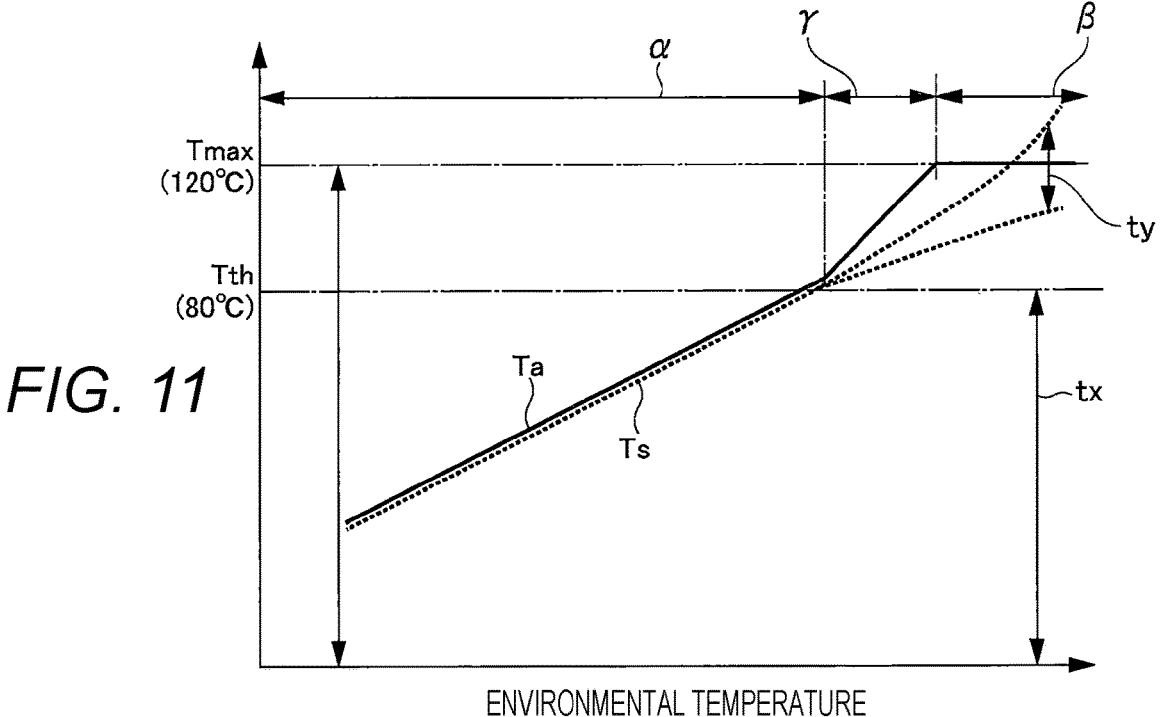
FIG. 11 is a characteristic diagram illustrating an operation example (Example 2) of the vehicle control device according to the second embodiment of the present invention.

Next, a vehicle control device of a second embodiment of the present invention will be described with reference to FIGS. 9 to 11. In FIGS. 9 to 11, portions corresponding to those in FIGS. 1 to 8 described in the first embodiment are denoted by the same reference signs.

Similarly to the first embodiment, the vehicle control device of the present embodiment is also a control device of an in-vehicle device installed in a vehicle which is a moving body such as an automobile and mounted on the vehicle. The vehicle control device of the second embodiment also has a function as a heating protection system for a wire harness which is a cable connected to the in-vehicle device.

[Configuration of Heating Protection System]

FIG. 9 illustrates a configuration of a heating protection system for a wire harness in a vehicle control device to which the present embodiment is applied.

In an overheat protection system of the present embodiment, a current flowing through the wire harness is detected by the current detection element 2. The temperature sensor 3*a* is a temperature sensor mounted on a vehicle, and is installed in the equipment mounted in the vicinity of an area where a wire harness is laid.

The fixed value 4 is a temperature set value used when the temperature sensor 3*a* is not used.

For example, the fixed value 4 is a design maximum value of the environmental temperature of the area where the wire harness is laid. The fixed value 4 is not determined to be one value, but is a design parameter set to an arbitrary value (predetermined value).

A standard temperature generation unit 5*c* generates the ambient temperature of the wire harness (the standard temperature Ta in the temperature estimation) by using the temperature sensor 3*a*, the fixed value 4, and the environmental temperature of the vehicle. The standard temperature generation unit 5*c* generates the standard temperature Ta on the basis of information 9*b* of the environmental temperature of the vehicle.

The temperature estimation unit 6 estimates and calculates the heating temperature of the wire harness by using the current value from the current detection element 2 and the standard temperature from the standard temperature generation unit 5*c*. This estimation calculation is performed by using a model based on the calorific value and the heat dissipation characteristics of the wire harness to be estimated. The model based on the calorific value and the heat dissipation characteristics of the wire harness is as described in the first embodiment.

The shutoff determination unit 7 outputs a shutoff instruction to the shutoff element 8 in a case where the estimated temperature of the wire harness estimated by the temperature estimation unit 6 exceeds the predetermined threshold.

The shutoff element 8 shuts off the current flowing through the wire harness on the basis of the shutoff instruction of the shutoff determination unit 7. As the shutoff element 8, a semiconductor switch composed of a power semiconductor is used.

[Generation Processing of Standard Temperature]

FIG. 10 illustrates an operation example (Example 1) of the standard temperature generation unit 5*c* in the present embodiment. In FIG. 10, a vertical axis represents the detected temperature of the temperature sensor 3*a*, and a horizontal axis represents the environmental temperature. A characteristic Ta indicated by a solid line in FIG. 10 is a characteristic of the standard temperature, and a characteristic Ts indicated by a broken line is a value of the temperature sensor 3*a*.

The standard temperature generation unit 5*c* switches between the temperature value of the temperature sensor 3*a* and the fixed value 4 according to the environmental temperature of the vehicle. In a case where the environmental temperature is low, the value of the temperature sensor 3*a* is output as the standard temperature Ta. As illustrated in FIG. 10, when the environmental temperature rises and the detected temperature of the temperature sensor 3*a* becomes higher than a constant temperature Tth, the measurement error of the temperature sensor 3*a* increases. The constant temperature Tth is, for example, 80° C. In a state where the detected temperature of the temperature sensor 3*a* is equal to or lower than the constant temperature Tth, the detection value Ts of the temperature sensor 3*a* and the standard temperature Ta are guaranteed to be equal to or lower than a certain error. This range is a temperature sensor compensation range tx. In the sensor guarantee range tx (the range of an environmental temperature a) where the detected temperature of the temperature sensor 3*a* is equal to or lower than the constant temperature Tth, the standard temperature generation unit 5*c* uses the detected temperature Ts of the temperature sensor 3*a* as the standard temperature.

On the other hand, when the detected temperature Ts of the temperature sensor 3*a* becomes higher than the constant temperature Tth, the measurement error becomes higher or lower than the actual temperature. That is, a variation ty tends to occur due to the individual difference of the temperature sensor 3*a*. In such a case, when the temperature value of the temperature sensor 3*a* is used as the standard temperature, an error occurs in the estimated temperature of the wire harness, and in a case where the estimated temperature becomes lower than the actual temperature, there is a possibility that the smoking or ignition is caused due to the current, which flows through the wire harness, not being shut off appropriately.

As described above, in the present embodiment, the standard temperature is switched to the fixed value 4 in a range β in which the error of the detection value of the temperature sensor 3a increases and the temperature value is unreliable. Here, the fixed value 4 is set to a value which is a design maximum temperature at a location where the wire harness is laid. Accordingly, since the estimated temperature of the wire harness is estimated to be higher than the actual temperature, it is possible to reliably shut off the current before reaching smoking or ignition. That is, according to the present embodiment, a configuration can be made in which in a case where the temperature sensor 3a is not reliable, the temperature estimation can be performed by a safe side.

Note that as the environmental temperature on the horizontal axis in FIG. 10, the value of the temperature sensor 3a can be used, but another temperature sensor may be used, and it is sufficient to detect a condition where the value of the temperature sensor 3a is unreliable.

FIG. 11 illustrates another operation example (Example 2) of the standard temperature generation unit 5c in the present embodiment. In the example of FIG. 10, configuration is illustrated in which when the temperature value of the temperature sensor 3a reaches the range β of the unreliable condition, the standard temperature is switched to the fixed value 4.

On the other hand, in the example illustrated in FIG. 11, a configuration is illustrated in which the standard temperature is gradually switched to the fixed value instead of being switched to the fixed value at a certain value. For example, after the detected temperature of the temperature sensor 3a exceeds the constant temperature Tth, in a certain temperature range γ, the weighted average of the value of the temperature sensor 3a and the value of the fixed value 4 is set as the standard temperature.

Further, in the range β in which the environmental temperature further increases, the fixed value is set as the standard temperature.

Note that, in the present embodiment, a configuration has been described in which the standard temperature is switched to the fixed value when the detected temperature of the temperature sensor 3a having a proportional relationship with the environmental temperature exceeds the predetermined threshold Tth. However, the threshold Tth is appropriately set according to the performance of the temperature sensor 3a, and is not determined to be one value. In addition, in the present embodiment, the temperature sensor 3a is used, but a configuration may be made in which a plurality of temperature sensors are connected.

Third Embodiment

Figure 12:
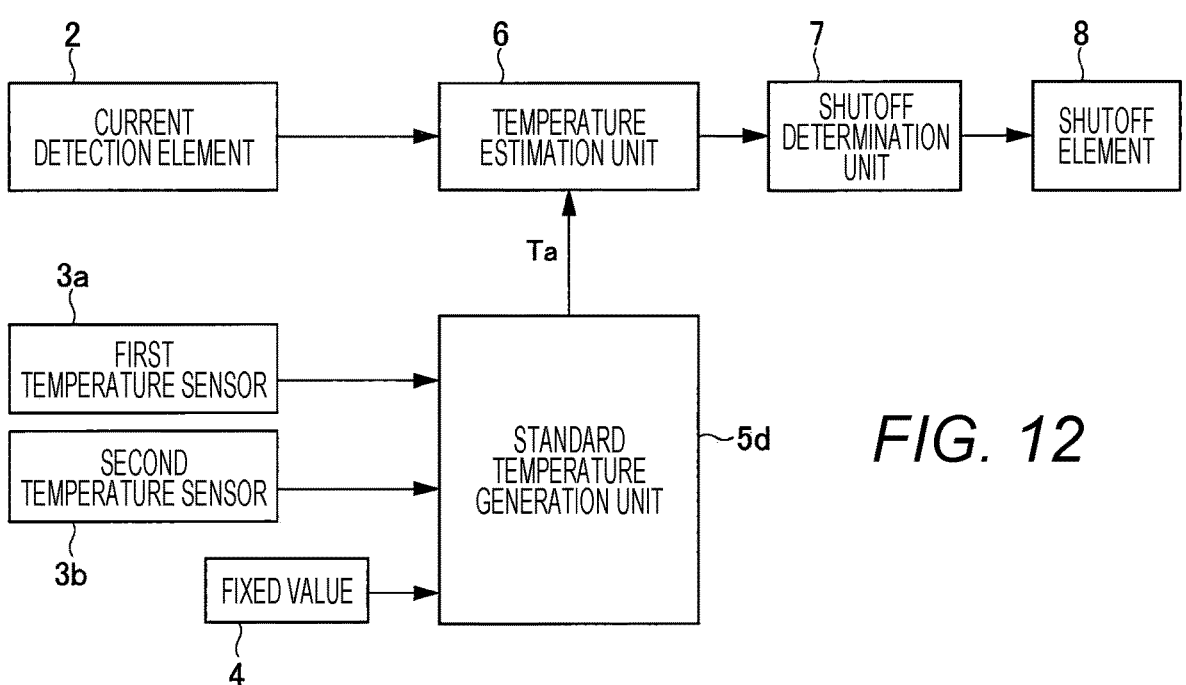
FIG. 12 is a configuration diagram of a vehicle control device according to a third embodiment of the present invention.

Next, a vehicle control device of a third embodiment of the present invention will be described with reference to FIG. 12. In FIG. 12, portions corresponding to those in FIGS. 1 to 11 described in the first and second embodiments are denoted by the same reference signs.

Similarly to the first and second embodiments, the vehicle control device of the present embodiment is also a control device for an in-vehicle device installed in a vehicle which is a moving body such as an automobile and mounted on the vehicle. This vehicle control device also has a function as a heating protection system for a wire harness which is a cable connected to the in-vehicle device.

[Configuration of Heating Protection System]

FIG. 12 illustrates a configuration of a heating protection system for a wire harness in a vehicle control device to which the present embodiment is applied.

In the configuration illustrated in FIG. 12, a plurality of temperature values from the first temperature sensor 3a and the second temperature sensor 3b are input to the standard temperature generation unit 5d. For example, the first temperature sensor 3a detects the temperature of the intake air of the engine, and the second temperature sensor 3b is mounted on the air conditioner and detects the outside air temperature. In this case, both of the temperature sensors detect a temperature value based on the outside air temperature, and it is preferable that the first temperature sensor 3a and the second temperature sensor 3b detect temperatures at the same site or location.

Then, the standard temperature generation unit 5d compares the plurality of temperature values, and when a difference between the temperature values is smaller than a predetermined value, the standard temperature generation unit 5d outputs, as the standard temperature Ta, a temperature value based on the first temperature sensor 3a and the second temperature sensor 3b. In a case where the difference between the temperature values of the first temperature sensor 3a and the second temperature sensor 3b becomes larger than the predetermined value, the standard temperature generation unit 5d outputs the fixed value 4 as the standard temperature Ta.

According to the configuration illustrated in FIG. 12, when a failure occurs in any one of the first temperature sensor 3a and the second temperature sensor 3b, the temperature difference between these temperature values becomes significantly large, so that the failure can be detected. That is, when it is detected that the temperature values of the first temperature sensor 3a and the second temperature sensor 3b become in an unreliable state, the standard temperature generation unit 5d outputs the fixed value 4 as the standard temperature Ta. The value of the fixed value 4 is set to the design maximum temperature of the location where the wire harness to be subjected to temperature estimation is laid.

Accordingly, it is possible to avoid the estimated temperature in the temperature estimation unit 6 from becoming a value lower than the actual temperature of the wire harness, and it is possible to reliably prevent the smoking or ignition of the wire harness.

In the configuration illustrated in FIG. 12, the first temperature sensor 3a and the temperature sensor 3b may be sensors other than the sensor which detects the temperature of the intake air of the engine and the temperature sensor which detects the outside air temperature of the air conditioner described above, and may be any combination that can detect the failure of the first temperature sensor 3a and the second temperature sensor 3b. In addition, the first temperature sensor 3a and the second temperature sensor 3b are appropriately selected according to the location where the wire harness to be subjected to temperature estimation is laid.

Fourth Embodiment

Figure 13:
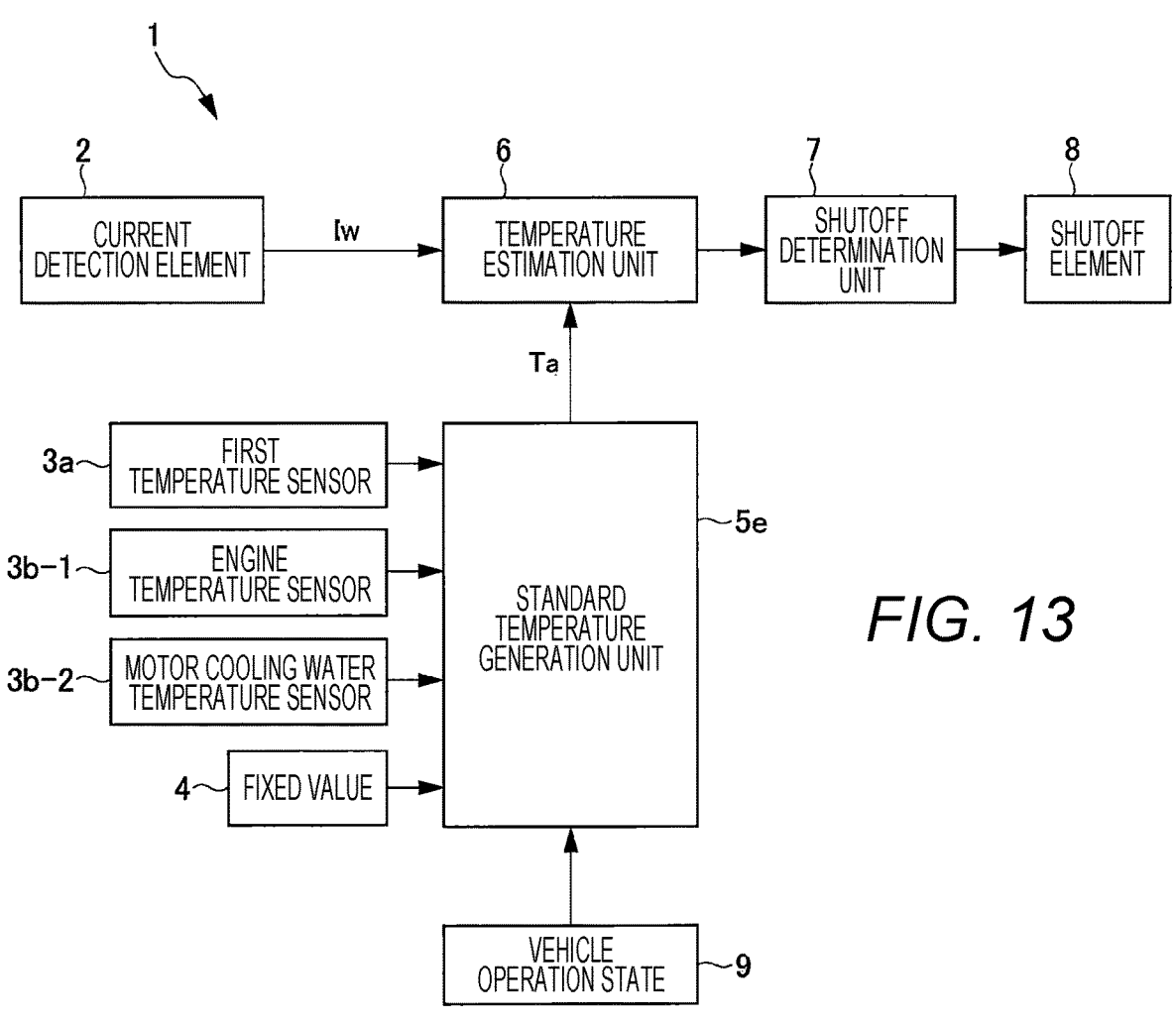
FIG. 13 is a configuration diagram of a vehicle control device according to a fourth embodiment of the present invention.

Next, a vehicle control device of a fourth embodiment of the present invention will be described with reference to FIG. 13. In FIG. 13, portions corresponding to those in FIGS. 1 to 12 described in the first to third embodiments are denoted by the same reference signs.

Also in the vehicle control device of the present embodiment, similarly to the first to third embodiments, the vehicle control device is a control device of an in-vehicle device installed in a vehicle which is a moving body such as an automobile and mounted on the vehicle, and the vehicle control device has a function as a heating protection system for a wire harness which is a cable connected to the in-vehicle device.

Note that the vehicle in which the vehicle control device of the present embodiment is installed is a so-called hybrid vehicle including both an engine and a motor. There are various types of hybrid vehicles including both an engine and a motor, but in the present embodiment, any of the hybrid types may be used.

[Configuration of Heating Protection System]

FIG. 13 illustrates a configuration of a heating protection system for a wire harness in a vehicle control device to which the present embodiment is applied.

In the configuration illustrated in FIG. 13, the temperature value from the first temperature sensor 3a, a plurality of temperature values from two second temperature sensors 3b-1 and 3b-2, and the temperature value from the second temperature sensor 3b are input to a standard temperature generation unit 5e.

As the first temperature sensor 3a, a sensor is used which is mounted on the air conditioner and detects the outside air temperature.

As one second temperature sensor 3b-1 of the two prepared second temperature sensors, an engine temperature sensor is used which detects the temperature of the cooling water of the engine. Instead of the engine cooling water temperature sensor, an engine oil temperature sensor may be used. As the other second temperature sensor 3b-2, a motor cooling water temperature sensor is used.

Then, the standard temperature generation unit 5e is the same as the standard temperature generation unit 5a described as the first embodiment in that the standard temperature generation unit 5e acquires the information 9 of the vehicle operation state, and switches the temperature to be adopted as the standard temperature Ta according to the vehicle speed between the first temperature sensor 3a and the second temperature sensor 3b-1 or 3b-2. The switching according to the vehicle speed is performed, for example, depending on whether the vehicle is traveling or stopped.

However, in the case of the present embodiment, two second temperature sensors 3b-1 and 3b-2 are provided, and the standard temperature generation unit 5e compares the detected temperatures of the two second temperature sensors 3b-1 and 3b-2. Further, in the case of outputting the temperature detected by the second temperature sensor as the standard temperature, the standard temperature generation unit 5e sets, as the standard temperature, a higher detected temperature of the second temperature sensors 3b-1 or 3b-2 among the detected temperatures of the two second temperature sensors 3b-1 and 3b-2.

Accordingly, even in a hybrid vehicle including both an engine and a motor, the standard temperature can be set according to the actual temperature in the front area. For example, in a stop period after mainly using the motor to travel with the engine stopped, the temperature of the cooling water of the motor is higher than the engine temperature. Therefore, by using the motor cooling water temperature sensor 3b-1 as the second temperature sensor, the standard temperature can be set appropriately. On the other hand, in the stop period after mainly using the engine and hardly using the motor to travel, the engine temperature is higher than the temperature of the cooling water of the motor, and thus the standard temperature can be set appropriately by using the engine temperature sensor 3b-2 as the second temperature sensor. Therefore, the standard temperature can be set appropriately also in the hybrid vehicle.

Note that also in the case of the present embodiment, in a case where a temperature difference between at least two temperature values of the plurality of temperature sensors 3a, 3b-1, and 3b-2 is significantly large, the fixed value 4 is set as the standard temperature. Alternatively, as described in the third embodiment, when the detected temperature is a temperature exceeding the temperature sensor guarantee range, the fixed value 4 may be used as the standard temperature.

<Modification>

Note that the above-described embodiments have been described in detail in order to describe the present invention in an easily understandable manner, and are not necessarily limited to those having all the described configurations.

For example, each of the engine temperature sensor, the motor cooling water temperature sensor, the sensor which is mounted on the air conditioner and detects the outside air temperature, and the like as specific examples of the temperature sensor described in the above-described embodiments is illustrated as a suitable example, and another sensor installed in the vehicle may be used as long as the sensor measures the temperature in the vicinity of the wire harness for which temperature estimation is desired.

As an example, as the engine temperature sensor, in addition to the temperature sensor of the cooling water of the engine, various temperature sensors installed in the engine or the vicinity thereof, such as the engine oil temperature sensor, can be applied.

In addition, in the configuration diagrams illustrated in FIG. 1 and the like, only the control lines and the information lines considered to be necessary for the description are illustrated, and not all the control lines and the information lines on the product are necessarily illustrated. It may be considered that almost all the components are connected to each other in actual.

In addition, in a case where the system of the present example is configured by an information processing device such as a computer, a program for realizing the heating protection system of the vehicle control device may be prepared in a nonvolatile storage or a memory in the computer, and in addition, may be transferred in a recording medium such as an external memory, an IC card, an SD card, or an optical disk.

REFERENCE SIGNS LIST 1 heating protection system
2 current detection element
3a first temperature sensor
3b, 3b-1, 3b-1 second temperature sensor
4 fixed value
5, 5a, 5b, 5c, 5d, 5e standard temperature generation unit
6 temperature estimation unit
7 shutoff determination unit
8 shutoff element
8a current sensing MOS-FET
9 vehicle operation state information
9, 9a, 9b information (vehicle speed)
10 wire harness
11 battery
12 resistor
13 calculator
14 drive management unit
15 drive command
20 engine

The invention claimed is:

1. A vehicle control device comprising:
a computer configured to:
detect a current flowing through a wire harness which supplies power to in-vehicle equipment mounted on a vehicle;
obtain a standard temperature by using a predetermined value or a detection value of a predetermined temperature sensor among a plurality of temperature sensors mounted on the vehicle according to a traveling state of the vehicle or an environment;
calculate an estimated temperature of the wire harness by using a current detection value of the current and a standard temperature value of the standard temperature;
make a shutoff determination on a basis of the estimated temperature; and
shut off the current flowing through the wire harness on a basis of the shutoff determination, wherein the standard temperature is acquired by switching between a temperature sensor, which is mounted on the vehicle and detects a temperature depending on an outside air temperature, and a temperature sensor, which detects a temperature of equipment mounted on the vehicle, according to the traveling state of the vehicle.

2. The vehicle control device according to claim 1, wherein the predetermined value is a fixed value.

3. The vehicle control device according to claim 1, wherein the standard temperature is acquired by switching to a specific temperature sensor among the plurality of temperature sensors mounted on the vehicle according to the traveling state of the vehicle.

4. The vehicle control device according to claim 1, wherein the standard temperature is calculated on a basis of a weighted average of a plurality of temperature sensor values obtained from the plurality of temperature sensors mounted on the vehicle according to the traveling state of the vehicle.

5. The vehicle control device according to claim 1, wherein
the temperature sensor which is mounted on the vehicle and detects the outside air temperature is a temperature sensor which detects an intake air temperature of an engine, and
the temperature sensor which detects the temperature of the equipment mounted on the vehicle is a temperature sensor which detects a temperature of an engine.

6. The vehicle control device according to claim 1, wherein
the temperature sensor which is mounted on the vehicle and detects the outside air temperature is a temperature sensor which detects an outside air temperature, and
the temperature sensor which detects the temperature of the equipment mounted on the vehicle is a temperature sensor which detects a temperature of a motor which drives the vehicle.

7. The vehicle control device according to claim 1, wherein
the temperature sensor which is mounted on the vehicle and detects the outside air temperature is a temperature sensor which detects an outside air temperature, and
the temperature sensor which detects the temperature of the equipment mounted on the vehicle is a temperature sensor, which detects a high temperature, among a temperature sensor which detects a temperature of an engine and a temperature sensor which detects a temperature of a motor which drives the vehicle.

8. The vehicle control device according to claim 1, wherein
the standard temperature is generated on a basis of a temperature detection value of the temperature sensor in a case where a detected temperature of the temperature sensor is lower than a predetermined value, and
a predetermined fixed value is set as the standard temperature in a case where the detected temperature of the temperature sensor is higher than the predetermined value.

9. The vehicle control device according to claim 1, wherein
the standard temperature is generated on a basis of temperature detection values of the plurality of temperature sensors in a case where a difference between the temperature detection values of the plurality of temperature sensors is smaller than a predetermined value, and
a predetermined fixed value is set as the standard temperature in a case where the difference between the temperature detection values of the plurality of temperature sensors is larger than the predetermined value.

10. A method performed by a computer, comprising:
detecting a current flowing through a wire harness which supplies power to in-vehicle equipment mounted on a vehicle;
obtaining a standard temperature by using a predetermined value or a detection value of a predetermined temperature sensor among a plurality of temperature sensors mounted on the vehicle according to a traveling state of the vehicle or an environment;
calculating an estimated temperature of the wire harness by using a current detection value of the current and a standard temperature value of the standard temperature;
making a shutoff determination on a basis of the estimated temperature; and
shutting off the current flowing through the wire harness on a basis of the shutoff determination, wherein the standard temperature is acquired by switching between a temperature sensor, which is mounted on the vehicle and detects a temperature depending on an outside air temperature, and a temperature sensor, which detects a temperature of equipment mounted on the vehicle, according to the traveling state of the vehicle.

11. The method according to claim 10, wherein the predetermined value is a fixed value.

12. The method according to claim 10, wherein the standard temperature is acquired by switching to a specific temperature sensor among the plurality of temperature sensors mounted on the vehicle according to the traveling state of the vehicle.

13. The method according to claim 10, wherein the standard temperature is calculated on a basis of a weighted average of a plurality of temperature sensor values obtained from the plurality of temperature sensors mounted on the vehicle according to the traveling state of the vehicle.

14. The method according to claim 10, wherein
the temperature sensor which is mounted on the vehicle and detects the outside air temperature is a temperature sensor which detects an intake air temperature of an engine, and
the temperature sensor which detects the temperature of the equipment mounted on the vehicle is a temperature sensor which detects a temperature of an engine.

15. The method according to claim 10, wherein the temperature sensor which is mounted on the vehicle and detects the outside air temperature is a temperature sensor which detects an outside air temperature, and the temperature sensor which detects the temperature of the equipment mounted on the vehicle is a temperature sensor which detects a temperature of a motor which drives the vehicle.

16. The method according to claim 10, wherein the temperature sensor which is mounted on the vehicle and detects the outside air temperature is a temperature sensor which detects an outside air temperature, and the temperature sensor which detects the temperature of the equipment mounted on the vehicle is a temperature sensor, which detects a high temperature, among a temperature sensor which detects a temperature of an engine and a temperature sensor which detects a temperature of a motor which drives the vehicle.

17. The method according to claim 10, wherein the standard temperature is generated on a basis of a temperature detection value of the temperature sensor in a case where a detected temperature of the temperature sensor is lower than a predetermined value, and a predetermined fixed value is set as the standard temperature in a case where the detected temperature of the temperature sensor is higher than the predetermined value.

18. The method according to claim 10, wherein the standard temperature is generated on a basis of temperature detection values of the plurality of temperature sensors in a case where a difference between the temperature detection values of the plurality of temperature sensors is smaller than a predetermined value, and a predetermined fixed value is set as the standard temperature in a case where the difference between the temperature detection values of the plurality of temperature sensors is larger than the predetermined value.

19. A non-transitory computer-readable medium comprising computer-readable instructions, such that when executed, causes a computer to:

detect a current flowing through a wire harness which supplies power to in-vehicle equipment mounted on a vehicle;

obtain a standard temperature by using a predetermined value or a detection value of a predetermined temperature sensor among a plurality of temperature sensors mounted on the vehicle according to a traveling state of the vehicle or an environment;

calculate an estimated temperature of the wire harness by using a current detection value of the current and a standard temperature value of the standard temperature;

make a shutoff determination on a basis of the estimated temperature; and shut off the current flowing through the wire harness on a basis of the shutoff determination, wherein the standard temperature is acquired by switching between a temperature sensor, which is mounted on the vehicle and detects a temperature depending on an outside air temperature, and a temperature sensor, which detects a temperature of equipment mounted on the vehicle, according to the traveling state of the vehicle.

\* \* \* \* \*